United States Patent

[11] 3,562,415

[72] Inventors Friedrich Michels; Konrad Mueller, Darmstadt, Germany
[21] Appl. No. 818,304
[22] Filed Apr. 22, 1969
[45] Patented Feb. 9, 1971
[73] Assignee Fernseh GmbH Darmstadt, Germany
[32] Priority Apr. 23, 1968
[33] Germany
[31] 1,290,958

[54] METHOD AND SYSTEM FOR FURNISHING A LUMINOUS MARKER IN A SELECTED LOCATION ON THE SCREEN OF A TELEVISION RECEIVER

19 Claims, 4 Drawing Figs.

[52] U.S. Cl. .......... 178/5.6, 178/6.8
[51] Int. Cl. .......... H04n 5/00, H04n 7/00
[50] Field of Search .......... 178/5.8, 5.8A, 6F&M, 6TT, 7.5E, 6.6 (Inquired); 324/(Inquired); 340/324.1; 178/7.3D, 7.5D; 5.6, 6.8

[56] References Cited

UNITED STATES PATENTS

| | | | |
|---|---|---|---|
| 2,241,544 | 5/1941 | Dreyer, Jr. .......... | 178/6.8 |
| 2,784,247 | 3/1957 | Hurford .......... | 178/5.8 |
| 2,938,949 | 5/1960 | Vosburgh et al. .......... | 178/6.8 |
| 3,271,515 | 9/1966 | Harper .......... | 340/324.1 |

*Primary Examiner*—Richard Murray
*Assistant Examiner*—George G. Stellar
*Attorney*—Michael S. Striker

ABSTRACT: A lecturer enters a luminous mark at a selected location on a monitor screen during the recording of a television program. Marker signals are entered on the tape recording the audio of the program. At the receiver the marker signals derived from the tape are combined with vertical synchronization signals to yield a signal which increases the intensity of the cathode ray beam when the beam is in a location of the receiver screen which corresponds to the location selected by the lecturer at the transmitter.

Inventor :

Friedrich Michels
Konrad Müller by [signature]
Attorney

Inventor :
Friedrich Michels
Konrad Müller
by [signature]
Attorney

METHOD AND SYSTEM FOR FURNISHING A LUMINOUS MARKER IN A SELECTED LOCATION ON THE SCREEN OF A TELEVISION RECEIVER

BACKGROUND OF THE INVENTION

This invention relates to a method and system for generating luminous markers in selectable locations on images on a luminous screen, when said images are transmitted by means of television apparatus and are accompanied by sound transmission.

It is the custom in today's so-called teaching machines to derive the material to be taught from a tape, while simultaneously furnishing illustrations, as for example mathematical derivations, drawings, or other illustrative pictures on the screen of a cathode ray tube. Thus the pupil may receive the complete instructional program without presence of a teacher and may further determine the rate of learning himself. A television type of representation of still pictures is inexpensive relative to the similar representation of moving pictures, since the picture may be stored by means of a simple diapositive (or slide) scanner with an automatic slide advance, or, alternatively, with television scanning equipment with movie film which is advanced in a stepwise manner. The pictures may be transmitted from a central storage, thus obviating the necessity of a separate storage at each receiver location.

These known teaching machines have the disadvantage, in that the transmitted video signals do not contain signals for generating movable luminous markers, which could enable the lecturer to draw attention to a particular location on the picture. When the television scanning equipment transmits only still pictures, the same picture would have to be shown a number of times, each time with a luminous mark in a different position, thus requiring an unnecessary amount of programming material. Complicated movement of the luminous marker could not be achieved in this fashion.

SUMMARY OF THE INVENTION

The object of this invention is to enter marker signals corresponding to the desired location of a marker onto the audio recording means, such as for example a magnetic tape, to read the marker signals entered upon the tape at the receiver simultaneously with the audio signals, and to provide equipment at the receiver to convert the marker signals derived from the tape into a luminous mark on the screen at the desired location. This is achieved by changing the intensity of the cathode ray beam when said beam is at the desired location on the picture in such a manner that a luminous spot appears on the screen.

The main difficulty in achieving the above objective is the fact that no synchronism exists between the movement of the tape and the frame or vertical synchronization frequency of the video signal.

Two methods of solving the problem arising from this lack of synchronism are furnished in accordance with this invention. Thus, in a first embodiment of the present invention the marking signals for generating the luminous mark are analogue signals in the form of oscillations having variable frequencies. The frequency of these variable frequency signals depends upon the location of the desired marker relative to the vertical synchronization pulse and the horizontal synchronization pulse. At the receiver the variable frequency signals are combined with the vertical and horizontal synchronization pulses respectively in such a manner that a first and second signal is generated following said vertical and horizontal synchronization pulses respectively at time intervals determined by the respective frequencies of said variable frequency signals. The cathode ray beam intensity is then changed to create a luminous spot on the screen when the first and second signals coincide.

In a second preferred embodiment of the invention the marking signals are digital signals. At the transmitter, the coordinates of the location of the marker are converted into a code word and entered upon the tape. When this code word is read out at the receiver, the code word is entered into a storage means. In accordance with the contents of this code word storage means signals from a start-stop oscillator started by a vertical synchronization signal are then divided, producing a signal at the last division which has the same phase relationship to the vertical synchronization pulse as had the marker applied at the transmitter. If desired, this last mentioned signal may be applied to a blocking oscillator whose output in turn serves to control the intensity of the cathode ray beam to produce the luminous marker on the screen. The luminous mark would then extend over a location corresponding to the length of time of the blocking oscillator output.

Thus the method and arrangement of this invention results in the transmission of the complete information contained in a lecture which is illustrated with slides, including any luminous marks the lecturer may wish to supply to point out particular areas in the demonstration material. It is of course obvious to one skilled in the art, that the same technique may be applied to moving pictures as well. The marker signals which signify the location of the marker may be entered upon the tape containing the audio portions of the transmission in either the same track as said audio transmission, or in one or more separate tracks. In those cases where the marking signals are entered upon the same track as the audio signals, it is of course desirable to have the marker signals lie within a frequency range which is outside of the audio range.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
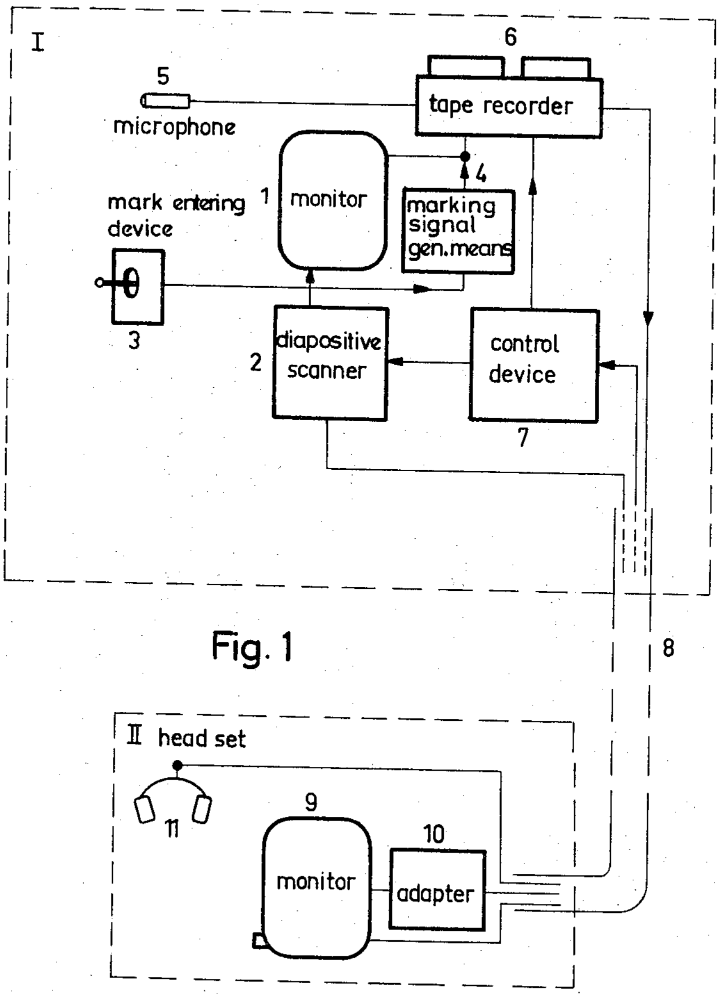
FIG. 1 is a schematic representation of an arrangement of a teaching machine with transmitter and receiver.

A preferred embodiment of the invention will now be described in relation to the drawing.

The preferred embodiment to be discussed here relates to a teaching machine. In FIG. 1, I denotes the transmitting arrangement where the program or lecture originates which is to be viewed at the receiver II. The transmitting means arrangement includes a monitor 1 for viewing still pictures or slides, an automatic diapositive scanner 2, which furnishes the picture signals to the monitor 1 and also to the receiver, and finally means for entering marking signals, denoted by 3, which furnish a luminous marker on the monitor 1 and also enter marking signals onto the audio storage means, here a tape recorder 6. For storing of the audio signals on the tape, a microphone 5 is provided. Further indicated in FIG. 1 are control means 7, which furnish the signals controlling the changing of the slides and the starting of the tape of tape recorder 6. The control means may be activated by the lecturer, by control signals furnished from the tape, and, finally, by signals from the receiver II. The receiver furnishes the signals via a cable 8. The signals include audio signals for the head phone 11, video signals from the diapositive scanner 2 in the transmitter which are accepted by the monitor 9, and, lastly, marker signals which are converted into a marker control pulse which in turn causes a luminous marker to appear on the monitor 9 in the desired location.

During the recording of the program the lecturer adjusts the mark entering means 3 until a luminous mark appears in the desired location on the screen of the monitor 1. He delivers the lecture into the microphone 5 and activates the diapositive scanner 2 to supply the appropriate slide at appropriate moments during the lecture. The program or lecture is stored in the diapositive scanner 2 and in the tape of tape recorder 6. The tape thus contains the audio frequency signals corresponding to the lecture, control signals for activating the device 2 for generating the signals corresponding to a selected diapositive or slide, and finally marker signals for generating the luminous marker at a determined position on the image produced on the screen of monitor 9 in the receiver.

Upon activation of the receiver II to request a selected program by means of buttons on the monitor 9, tape recorder 6 is activated simultaneously with the diapositive scanner and transmitter 2 which supplies signals corresponding to a determined diapositive or slide to the video transmitting channels at determined times. Furthermore a luminous marker appears on the image at the monitor at the receiver in the place selected by the lecturer to draw attention to a particular interesting feature. This luminous marker can move across the image relatively rapidly and is thus also usable to indicate motions on the image.

Figure 2:
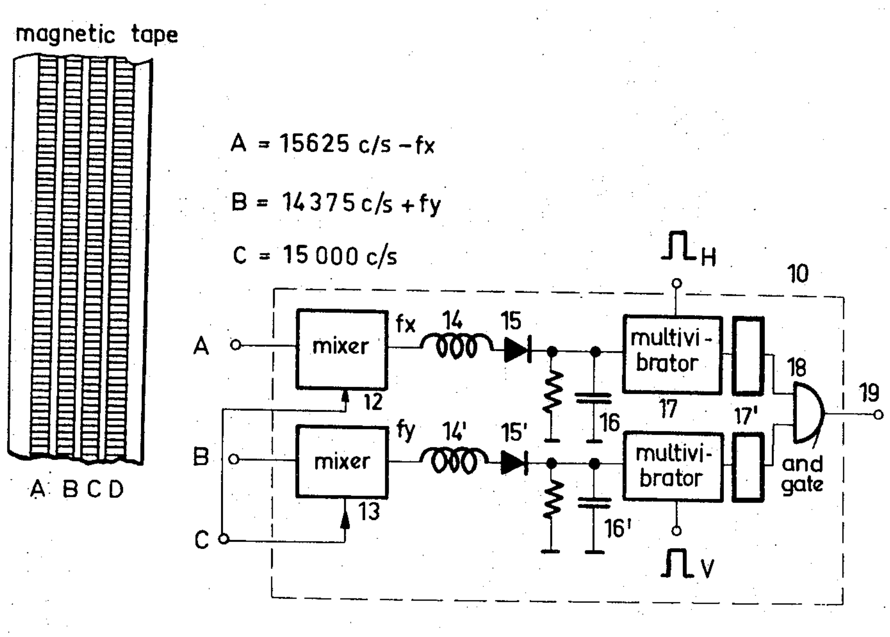
FIG. 2 is a circuit arrangement for generating marker control pulses in response to analogue signals derived from the tape.

The adapter system 10 will now be explained in more detail with reference to FIGS. 2 and 3. FIG. 2 shows one embodiment of such an adapter system which uses analogue signals as marker signals. In particular, the adapter 10 is furnished with signals of three different frequencies via three separate lines emanating from the readout means reading signals from the tape. These three frequencies are generated in part in dependence on the setting made by the lecturer in entering the mark in device 3. The particular setting is converted into corresponding frequencies of variable frequency signals in the marker signal generator 4 which constitutes part of the means for entering the marker signals into the audio storage. Thus, for example, the frequency of the variable frequency signal in track A may correspond to the $x$ coordinate of the image, that of track B to the $y$ coordinate, while the frequency in track C may be a reference frequency. Track D may be the audio track. Thus, for example, track A may contain a frequency of 15,625 Hz. minus the frequency signifying the $x$ coordinate, $f_x$, while track B may have a signal of a frequency of 14,375 Hz. plus the frequency $f_y$ signifying the $y$ coordinate. The reference frequency in track C may be a frequency of 15,000 Hz. If the variable frequency signal containing $f_y$ is denoted the first variable frequency signal, then this signal is furnished to mixer stage 13, while the second variable frequency signal, namely that containing the frequency $f_x$ is furnished to mix a stage 12. Thus the two variable frequency signals are mixed or heterodyned with the reference signal at stages 13 and 12 respectively. The resultant first and second difference frequency signals, $f_y$ and $f_x$, are obtained at the output of the respective mixer stages. The signals $f_y$ and $f_x$ are respectively fed to a coil 14' and 14. These coils are in turn connected to rectifiers 15' and 15 thus causing a first and second direct current signal to be applied to capacitors 16' and 16. These direct current signals correspond respectively to the frequencies $f_y$ and $f_x$. The first and second direct current signals are then applied respectively to a multivibrator 17' and 17. The pulses from these multivibrators 17' and 17 are started by the frame or vertical synchronization pulse V and the line or horizontal synchronization pulse H respectively. The multivibrators are so arranged that the length of the pulse furnished by each depends upon the direct current signal applied via capacitors 16' and 16 respectively. This is an arrangement which is well known in the art and will not be further described here. The resultant rectangular pulses are differentiated by differentiating means associated with the multivibrator and the trailing edge signal resulting from the differentiation of the trailing edge of each pulse is applied to coincidence means, here an AND gate 18. Prior to application to the AND gate the trailing edge signal derived from multivibrator 17' is lengthened so that it extends approximately one line interval. Upon coincidence of the signals applied to the two inputs of AND gate 18 the marker control pulse is generated at the output 19 of AND gate 18. This marker control pulse is applied to the control system controlling the cathode ray beam of the receiver and results in a luminous mark appearing on the screen at the desired location.

Although the above embodiment using analogue signals results in a relatively simple circuitry, it may under certain circumstances be preferable to use digital signals. A definite advantage of using digital signals is, that only one track on the tape is required while, as demonstrated above three tracks are required in the analogue case. In FIG. 3 this track is denoted by a A+. A typical signal from the track A+ is illustrated next to the illustration of the tape in FIG. 3. Reference to this FIG. will show that the signal consists of an amplitude modulated high frequency oscillation in which the various modulation sections each correspond to one or more bits in a code word. If it is desired, for example, to specify the coordinates of the marker within the width of one dot of the television image then a code word is required which corresponds to any selected number between 0 and 400,000. This number would correspond to the phase or time difference between the marker when in its selected location and the vertical synchronization pulse. Numbers between 0 and 400,000 may be specified by use of a code word having 17 bits. The train of oscillations on track A+ would then consist of 17 sections, each having either a large or a small amplitude. The large and small amplitudes would correspond respectively, for example, to a 0 or a 1. The high frequency oscillations which are amplitude modulated by these digital signals have a period which has an integral relationship with the width of a bit. Thus timing signals may be derived by frequency division of the carrier, for purposes which will be described in detail below. This amplitude modulated signal may extend over a time which is very considerably smaller than the time for a frame. Further, it does not have to occur in synchronism with the synchronization signals on the video channel.

Figure 3:
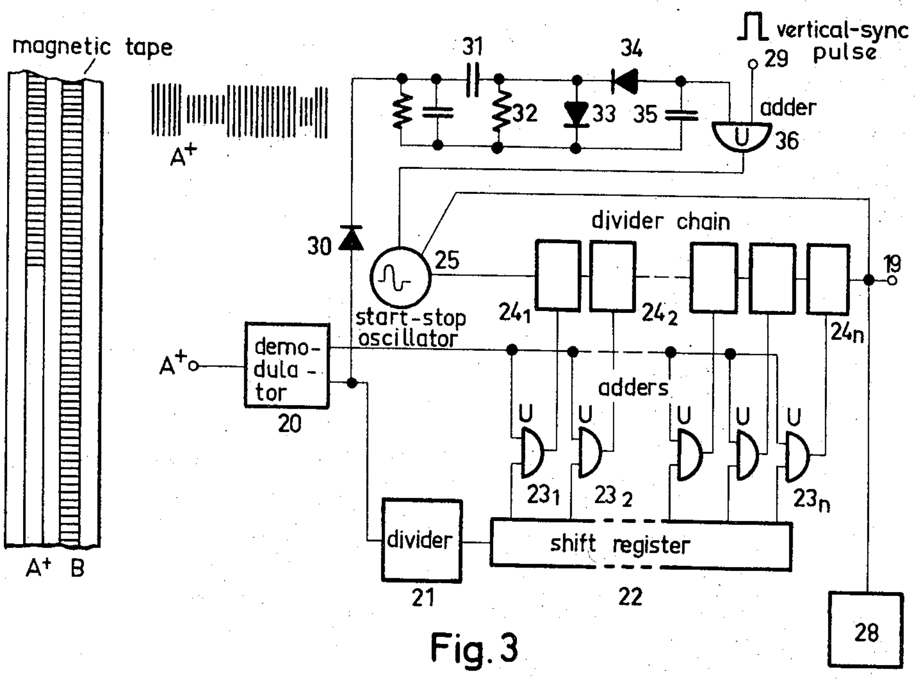
FIG. 3 is a circuit arrangement for deriving the marker control pulse from digital signals entered upon the tape.

The signal derived from track A+ is first applied to demodulator means, here a demodulator denoted by the numeral 20 in FIG. 3. This demodulator furnishes at its output DC signals corresponding to the modulation, or the code word. It also furnishes the high frequency oscillations or carrier frequency signal at another output. The carrier frequency signals are then applied to a divider 21 which divides the frequency until such a time as one oscillation corresponds exactly to the width of a bit in the code word. After the frequency division the signal is limited to obtain a rectangular signal which is applied to shift register means 22. Shift register 22 has a plurality of outputs at each of which the timing signal appears sequentially in synchronism with the signal at the input of the shift register. A plurality of AND gates, numbered $23_1$ to $23_n$ in FIG. 3, each have a first and second input and an output. Each first input is connected to receive the demodulated code word signal from demodulator 20 while each second input is connected to a corresponding stage in the shift register. The shift register and AND gates together constitute logic means. The output of these logic means is the output of the AND gates $23_1$ to $23_n$. These outputs, which occur of course when the inputs of the AND gate each receive a signal at the same time, are each applied to a corresponding stage in the divider chain having stages $24_1$ to $24_n$. These stages are connected in series and may be set to a first or second position in dependence on the output of the corresponding AND gate.

Thus when a code word is furnished from track A+ to the demodulator 20, each bit in the code word is applied to a corresponding stage in the divider chain by means of the shift register 22 and the AND gates $23_1$ to $23_n$. This causes the code word to be stored in the divider chain which constitutes code word storage means. The code word is stored since at the end of the code word no further change in the condition of each stage in the divider chain occurs until the process which is now described. The main input of the divider chain, namely the input stage $24_1$, is connected to a start-stop oscillator 25. The frequency of this oscillator is such that it has as many oscillations during the time corresponding to one frame as there are desired selectable marker locations. If it is desired to fix the marker location within each dot forming the image, then for 25 frames per second 400,000 ×25 oscillations per second would be required. However, it is usually adequate to limit the marker locations to 100,000 thus requiring 2.5M Hz. as the frequency for the start-stop oscillator. Starting of the start-stop oscillator 25 is accomplished by the output of AND gate 36, one of whose inputs is the vertical synchronization pulse. If the code word is stored in the divider chain and an output occurs from AND gate 36 then start-stop oscillator 25 serves to reset sequentially the stages of the divider chain. Upon resetting of the final stage, namely stage $24_n$ the marker control pulse is generated. This is applied to an electrode which serves to block start-stop oscillator 25. It is also used to generate the luminous marker on the screen of the receiver. Further an echo generator 28 may be supplied to repeat this pulse over several consecutive frames.

It will be noted that in the above description and in FIG. 3 the vertical synchronization pulse is not used directly to start the start-stop oscillator 25, but is applied through AND gate 36. The reason for this is that for proper operation of the circuit the start-stop oscillator must supply the signals for resetting the stages in the divider chain only when the code word is stored in said chain. The start-stop oscillator 25 must thus not be activated while the code word is being entered or after a code word has already been reset. The circuitry for achieving this correct timing will now be explained. For this purpose the rectifier 30 is connected to the output of demodulator 20 which furnishes the carrier signal. The rectified carrier signal which is furnished at the output of rectifier 30 is then differentiated by means of a differentiator circuit comprising capacitor 31 and resistor 32. Since the carrier frequency signal only lasts for the duration of the code word, a positive pulse is generated by the differentiator at the beginning of the code word and a negative pulse at the end of the code word. The positive pulse is shunted by rectifier 33, while the negative pulse is transmitted to capacitor 35 via rectifier 34. The capacitor 35 is thus charged negatively, and gate 36 is so arranged that no pulse appearing at terminal 29 will be transmitted to start-stop oscillator 25 unless capacitor 35 has a negative charge. When such a negative charge is present, however, the transmission of the synchronization pulse through AND gate 36 also results in a discharge of the capacitor so that AND gate 36 is blocked for all subsequent synchronization pulses until the capacitor is recharged by the next code word. Since the trailing edge of the code word is used, obviously no synchronization pulse arriving while the code word is entered into the code word storage means or divider chain can become effective. Thus the requirement that the start-stop oscillator is activated only following upon the storage of a code word is met by the above circuitry.

Figure 4:
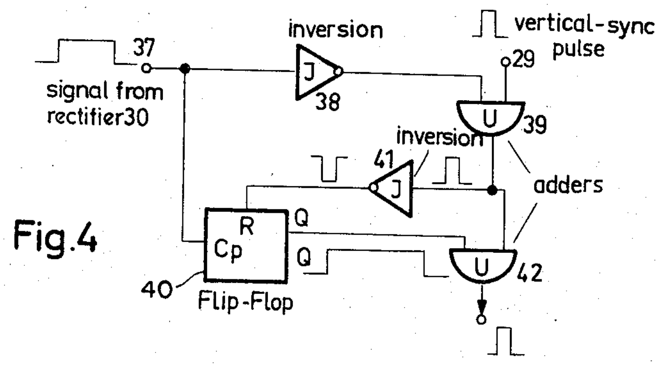
FIG. 4 shows a circuit arrangement for preventing incorrect marker control pulse generation in a digital type arrangement.

Alternatively the above requirements may also be met by the use of exclusively digital circuitry, as will be explained by reference to FIG. 4. Here the rectified carrier signal furnished at the output of rectifier 30 is applied at terminal 37. The pulse applied at this terminal 37 thus has a duration corresponding to the duration of the code word. After inversion by inverter 38 this signal is applied to one input of AND gate 39 whose other input is connected to receive the vertical synchronization pulse. Thus an output appears at AND gate 39 only when a vertical synchronization pulse is received outside of the duration of the code word. The signal from rectifier 30 is further applied to the set input of a bistable circuit labeled flip-flop in the FIG. The reset input for the flip-flop is connected to the output of inverter 41 whose input is connected to the output of AND gate 39. The circuitry is so arranged that the trailing edge of the output of inverter 41 resets the flip-flop. The pulse resulting at the output Q of flip-flop 40 thus extends from the beginning of the code word to the trailing edge of the vertical synchronization pulse received subsequently to said code word. The output Q of flip-flop 40 is connected to one input of AND gate 42 whose other input is connected to the output of AND gate 39. The marker control pulse is then generated at the output of AND gate 42. This pulse is thus generated exclusively by the first vertical synchronization pulse following the code word. No further marker control pulse is generated until a new code word is received since the arrangement is blocked until such time.

The above described arrangements thus permit completely automatic operation. It should also be noted that the invention is not limited to the reproduction of diapositive or still pictures. It may equally be applied when the lecturer wishes to use another source of video signals which may be taped scenes of a dynamic process. The marker may be entered into the picture as described above. Since the marking signals are then stored on the tape, both the audio tape and the video tape may then later run together simultaneously. Of course the circuit disclosed here also may be modified in a number of ways by one skilled in the art. Thus for example it is possible instead of one code word storage means to use two separate divider chains each containing a code word referring to the location in two different coordinate directions. Subsequent coincidence circuits may then be used to combine the two signals resulting from resetting of the divider chains to generate the desired marker control pulse.

It is of course also possible to generate luminous numbers, letters, or other symbols on the screen by means of a sequence of luminous markers applied with sufficient speed.

While the invention has been illustrated and described as embodied in specific circuits, it is not intended to be limited to the details shown, since various modifications and structural and circuit changes may be made without departing in any way from the spirit of the present invention.

What is claimed as new and desired to be protected by Letters Patent is set forth in the appended.

We claim:

1. In a television transmitting-receiving system, having a transmitter, video and audio signal storage means, and a receiver, said transmitter having means for generating vertical synchronization signals, said receiver having a screen, and a cathode ray beam impinging upon said screen: a method for furnishing a luminous marker in a selected location on the image on said screen of said receiver, comprising in combination, the steps of entering marker signals corresponding to the phase of said marker relative to a vertical synchronization signal when said marker is in said selected location, into said audio storage means at said transmitter; providing access to said storage means at said receiver reading said marker signals out of said audio storage means at said receiver; and increasing the intensity of said cathode ray beam when said cathode ray beam has the phase relationship to said vertical synchronization signal signified by said marker signals.

2. A method as set forth in claim 1, wherein said television transmitter further generates horizontal synchronization signals; wherein said marker signals further signify the phase between said horizontal synchronization signals and said marker when in said selected location; and wherein the intensity of said cathode ray beam is increased when said beam has the phase relation to both said vertical and horizontal synchronization signals signified by said marker signals.

3. A method as set forth in claim 2, wherein said marker signals comprise a reference frequency signal; a first variable frequency signal; and a second variable frequency signal, the frequency difference between said reference signal and said first and second variable frequency signals respectively corresponding to the phase between said marker and said vertical and horizontal synchronization signals.

4. A method as set forth in claim 3, wherein the step of increasing the intensity of said cathode ray beam comprises mixing said reference signal and said first and second variable frequency signals respectively in such a manner that a first and a second difference frequency signal are derived, having, respectively, a frequency corresponding to the phase of said marker relative to said vertical and horizontal synchronization signals; rectifying said first and second difference frequency signals to obtain corresponding first and second direct current signals; generating a first pulse upon receipt of a vertical synchronization signal, said pulse having a duration corresponding to said first direct current signal; generating a second pulse upon receipt of a horizontal synchronization signal, said second pulse having a duration corresponding to said second direct current signal; and increasing the intensity of said cathode ray beam upon coincidence of the trailing edge of said first and second pulses.

5. A method as set forth in claim 2, wherein said marker signals comprise a code word.

6. In a television-transmitting system having a transmitter, audio and video storage means, and a receiver, said transmitter having means for generating vertical and horizontal synchronization signals, said receiver having a screen and a cathode ray beam impinging upon said screen: a system, comprising, in combination, means for entering marker signals corresponding to the location of a marker relative to a vertical synchronization signal into said audio storage means at said transmitter; means providing access to said storage means at said receiver means for reading out said marker signals from said audio storage means at said receiver; and marker control means for increasing the intensity of said cathode ray beam when said cathode ray beam has the phase relationship relative to said vertical synchronization signals specified by said marker signals.

7. An arrangement as set forth in claim 6, wherein the intensity of said cathode ray beam increases in response to a marker control pulse; wherein said audio storage means has a first, second, and third storage areas; wherein said means for entering marker signals into said audio storage means at said transmitter comprises means for entering a reference frequency signal, and a first and second variable frequency signal into said first, second and third storage areas respectively; said first and second variable frequency signals having frequencies corresponding, respectively, to the phase relationship between said transmitter vertical synchronization signal and said transmitter horizontal synchronization signal, and said marker when in said selected location.

8. An arrangement as set forth in claim 7 wherein said marker control means comprise first and second mixing means for mixing said reference frequency signal with said first and second variable frequency signals respectively, thus furnishing a first and second difference frequency signal; means for converting said first and second difference frequency signals into a first and second direct current signal respectively, said first and second direct current signals having respective amplitudes corresponding to the frequency of the respective difference frequency signals; first pulse generating means for generating a first pulse upon receipt of a vertical synchronization signal, the duration of said pulse corresponding to said first direct signal; second pulse generating means for generating a second pulse upon receipt of a horizontal synchronization signal, said second pulse having a duration corresponding to said second direct current signal; first and second differentiation means for differentiating said first and second pulse respectively, thus furnishing a first and second trailing edge signal; and coincidence means for furnishing said marker control pulse upon coincidence of said first and second trailing edge signals.

9. An arrangement as set forth in claim 8 wherein said first and second pulse generating means are a first and second multivibrator respectively.

10. An arrangement as set forth in claim 8 wherein said coincidence means comprise an AND gate.

11. An arrangement as set forth in claim 7 wherein said audio storage means comprise a tape; and wherein said first, second and third storage areas comprise corresponding tracks on said tape.

12. An arrangement as set forth in claim 7, wherein said marker signals comprise a carrier frequency signal; and a code word modulated upon said carrier frequency signal, signifying the number of possible marker locations between the occurrence of a vertical synchronization signal and the selected marker location.

13. An arrangement as set forth in claim 12, wherein said code word comprises a plurality of bits; and wherein said marker control means comprise code word storage means having a number of stages corresponding to said number of bits; storage input means for entering said code word into said code word storage means; and reset means for resetting said code word storage means stage-by-stage, whereby said marker control pulse is generated upon resetting of the last of said stages.

14. An arrangement as set forth in claim 13 wherein said carrier frequency signal has a period corresponding to the width of a bit of said code word; further comprising demodulator means for demodulating said marker signals, thus furnishing bit signals and a carrier signal; and wherein said storage input means comprise logic means for entering said bits into said stages under control of said carrier signal.

15. An arrangement as set forth in claim 14 wherein said period of said carrier frequency signal is an integral multiple of the width of a bit; further comprising frequency divider means for reducing the frequency of said carrier frequency signal, in such a manner that a timing signal is furnished having a period equal to the width of a bit; and wherein said logic means comprise shift register means having a plurality of shift register stages, for generating register outputs from said stages in response to said timing signals, and a plurality of AND gates, each having a first input connected to receive said bit signals, a second input connected to a stage of said shift register, and an output connected to a corresponding stage of said code word storage means.

16. An arrangement as set forth in claim 15 wherein said reset means comprise start-stop oscillator means adapted to generate a number of reset signals corresponding to the number of possible selected locations of said marker within a picture frame; and means for starting said start-stop oscillator in dependence upon receipt of a vertical synchronization signal.

17. An arrangement as set forth in claim 16, wherein said start-stop oscillator starts upon receipt of a start signal; and wherein said means for starting said start-stop oscillator comprise means for furnishing a terminating signal upon termination of a code word; means for storing said terminating signal until receipt of a vertical synchronization signal; and additional coincidence means for generating said start signal in response to coincidence of said vertical synchronization signal and said terminating signal.

18. An arrangement as set forth in claim 17, wherein said carrier frequency signal is present only during said code word; and wherein said means for furnishing a terminating signal comprise means for rectifying said carrier frequency signal, thus furnishing a rectified signal; means for differentiating said rectified signal, thus furnishing a positive and a negative differentiated signal; and means for selecting said negative differentiated signal to constitute said terminating signal.

19. An arrangement as set forth in claim 16, wherein said means for starting said start-stop oscillator comprise bistable logic means having a first output in response to a first signal signifying the start of said code word, and a second output in response to a bistable reset signal; selecting means for furnishing selected vertical synchronization signals, said selected vertical synchronization signals occurring in the absence of a code word; means for furnishing said bistable reset signals in dependence upon the trailing edge of said selected vertical synchronization signals; and means for furnishing said start signal upon joint receipt of a first output signal from said bistable logic means and a selected vertical synchronization signal.